United States Patent
Lindoff et al.

(10) Patent No.: US 9,432,131 B2
(45) Date of Patent: Aug. 30, 2016

(54) METHOD AND APPARATUS FOR HANDLING INTER-MODULATION INTERFERENCE IN A NETWORK NODE CAPABLE OF FDD COMMUNICATIONS

(71) Applicant: Telefonaktiebolaget L M Ericsson (publ), Stockholm (SE)

(72) Inventors: Bengt Lindoff, Bjärred (SE); Bo Hagerman, Tyresö (SE); Fredrik Nordström, Lund (SE); Fredrik Tillman, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/408,100

(22) PCT Filed: Nov. 28, 2014

(86) PCT No.: PCT/EP2014/076001
§ 371 (c)(1),
(2) Date: Dec. 15, 2014

(65) Prior Publication Data
US 2016/0156422 A1    Jun. 2, 2016

(51) Int. Cl.
*H04B 7/00* (2006.01)
*H04B 15/00* (2006.01)
*H04B 17/345* (2015.01)
*H04W 72/04* (2009.01)

(52) U.S. Cl.
CPC ............ *H04B 15/00* (2013.01); *H04B 17/345* (2015.01); *H04W 72/0453* (2013.01); *H04W 72/0473* (2013.01)

(58) Field of Classification Search
CPC ............. H04W 52/24; H04W 52/243; H04W 52/244; H04W 52/30; H04W 52/38
USPC ................ 370/310, 328, 329, 343, 464, 465
See application file for complete search history.

(56) References Cited

U.S. PATENT DOCUMENTS

| | | | | |
|---|---|---|---|---|
| 5,345,598 A | * | 9/1994 | Dent | H04W 52/346 455/127.1 |
| 6,438,356 B1 | * | 8/2002 | Lilja | H04W 52/18 370/318 |

(Continued)

FOREIGN PATENT DOCUMENTS

| CN | 103858355 A | 6/2014 |
|---|---|---|
| GB | 2508383 A | 6/2014 |

*Primary Examiner* — Dmitry H Levitan
(74) *Attorney, Agent, or Firm* — Coats & Bennett, PLLC

(57) ABSTRACT

There is provided a method of handling interference caused by inter-modulation in a network node. The method comprises detecting an interference level on an uplink carrier frequency band for stations, and determining whether the interference level indicates probable inter-modulation interference. If the interference level indicates probable inter-modulation interference, the method proceeds with scheduling an uplink transmission grant for at least one of the stations. The uplink transmission grant is valid for a first transmission time interval. The uplink transmission grant is transmitted to the station. A transmit level on the downlink carrier frequency band is assigned at the first transmission time interval such that inter-modulation interference is reduced on the uplink carrier frequency band at the first transmission time interval. An uplink transmission from the station is received at the first transmission time interval. Further methods, computer programs, a network node and a network node site are also disclosed.

36 Claims, 6 Drawing Sheets

(56) References Cited

U.S. PATENT DOCUMENTS

| | | | | |
|---|---|---|---|---|
| 8,401,507 B2* | 3/2013 | Hillery | ............... | H04W 52/12 |
| | | | | 375/345 |
| 8,837,401 B2* | 9/2014 | Immonen | ............... | H04B 1/525 |
| | | | | 370/329 |
| 9,025,478 B2* | 5/2015 | Jung | ............... | H04W 72/082 |
| | | | | 370/252 |
| 2009/0318087 A1* | 12/2009 | Mattila | ............... | H04B 1/109 |
| | | | | 455/63.1 |
| 2012/0236736 A1* | 9/2012 | Frank | ............... | H04W 24/04 |
| | | | | 370/252 |
| 2013/0194938 A1 | 8/2013 | Immonen et al. | | |
| 2013/0194984 A1 | 8/2013 | Cheng et al. | | |
| 2015/0036514 A1* | 2/2015 | Zhu | ............... | H04W 52/244 |
| | | | | 370/252 |

* cited by examiner

METHOD AND APPARATUS FOR HANDLING INTER-MODULATION INTERFERENCE IN A NETWORK NODE CAPABLE OF FDD COMMUNICATIONS

TECHNICAL FIELD

The present invention generally relates to methods for a network node and a network node site, such a network node and network node site, and a computer program for implementing any of the methods. In particular, the present invention relates to handling interference caused by inter-modulation.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, as well as discomply with a transmit spectrum mask. In order to reduce this effect, external cavity filters may be used in radio base stations (RBS) to filter out unwanted components outside wanted transmission band. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency not to interfere with each other's operations. There is no joint scheduling required among the operators, resulting in that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive band and cause desensitization. As a result, the created PIM products caused by the multi operator transmissions may result in lowered received uplink SNR for some scenarios. The problem may also arise in the case when the same operator uses two different carrier frequencies, e.g. operating in carrier aggregation setup, in any direction.

A normal operation to handle such problems would be to send a service technician to the RBS site to try to find the cause and replace or mend the causing element. However, such an operation may take a while, and there may be a not fully functioning RBS for a longer or shorter time.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower received SNR in the uplink.

An example is illustrated in FIG. 1 where two transmitted signals 100, 102, for example 3GPP frequency band 29 and band 17, from the same RBS give rise to a PIM product 104, in this case due third order intermodulation, i.e. at 2·f1−f2, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with the more bands there will be larger risks for co-sited RBSs for different operators, which may create PIM affecting any of the operators' receive bands. For the sake of brevity and easier understanding, the issue has been demonstrated above where inter-modulation is caused by two frequencies, but the similar effects may arise from further used frequencies, and used frequencies inter-modulating with inter-modulation products, and so on. That is, the more frequencies used at a network node site, the more likely is it that an inter-modulation product affects a receive band.

It is therefore a desire to handle such situations.

SUMMARY

The invention is based on the understanding that the above situation may or may not occur depending on situations that are hard to predict, e.g. the case of intermodulation caused by occurred metal oxidation, and that by sacrificing some capacity when the situation occurs, the issues may be limited. Furthermore, the sacrificing of some capacity may only be made until a service technician is able to get to the RBS site to try to find the cause and replace or mend the causing element. The de-sense due to PIM is thus determined by aid of at least one transmitter that a network (NW) node of the RBS site has control of Hence, once a control unit in the NW node has determined a UE or a subset of UEs being affected by inter-modulation interference, typically a subset of UEs at a cell border, the NW node schedules, in a first transmission time interval (TTI), an uplink (UL) grant to at least one of the these UEs valid for a second future TTI, and during the second TTI at least one of the by the NW node controlled transmitters is in principle turned low, i.e. such that at least the TX signal power is substantially reduced. For example, only necessary signalling, such as pilots e.g. Common Reference Signals (CRSs), synchronization signals such as primary/secondary synchronisation signals (PSS/SSS) and necessary control signals are transmitted, possibly by a lower power than normal. Thus, the PIM problem may be substantially reduced at a price of some capacity decrease, particularly only capacity decrease at higher resource utilizations by utilizing multi-service/user resource allocation/scheduling coordinated between transmit and receive. Furthermore, the implementation may be scheduler based and hence implemented as a computer program (software) using already defined scheduler hardware.

According to a first aspect, there is provided a method of handling interference caused by inter-modulation in a network node for wireless communication capable of frequency division duplex communication with a set of stations for wireless communication. The stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band. The method comprises detecting an interference level on the uplink carrier frequency band for a subset of stations of the set of stations, and determining whether the interference level indicates probable inter-modulation interference. If the interference level indicates probable inter-modulation interference, the method proceeds with scheduling an uplink transmission grant for at least one of the stations of the subset of stations, wherein the uplink transmission grant is valid for a first transmission time interval, transmitting the uplink transmission grant to the at least one station of the subset of stations, assigning a transmit level on the downlink carrier frequency band at the first transmission time interval such that inter-modulation interference is reduced on the uplink carrier frequency band at the first transmission time interval, and receiving an uplink transmission from the at least one station of the subset of stations at the first transmission time interval.

The method may comprise identifying the at least one of the stations of the subset of stations, wherein significant inter-modulation interference is probable for the at least one of the stations, by determining whether the interference level indicates probable inter-modulation interference may comprise receiving a power head room report from at least one of the stations of the subset of stations, determining based on at least the power head room report whether the station is transmitting on maximum power, and, if determined that the station is transmitting on maximum power and a signal-to-interference-and-noise ratio is below a threshold, determining inter-modulation interference as probable for the at least one of the stations.

The scheduling of an uplink transmission grant valid for the first transmission time interval may be for a future transmission time interval and may be performed at a present transmission time interval.

The assigning of transmit level on the downlink carrier frequency band may comprise transmitting only system information, wherein the system information may comprise control channel signals, reference signal or synchronization signals, or any combination thereof. The assigning of transmit level on the downlink carrier frequency band may comprise transmitting at a lower power than nominal power.

The communication from the network node to any of the stations may be performed also on a second downlink carrier frequency band, or communication from any of the stations may also performed on a second uplink carrier frequency band for carrier aggregation, wherein the assigning of transmit level on the downlink carrier frequency band may be performed on the downlink carrier frequency band that has a frequency relation to an uplink carrier frequency band on which the interference level indicated probable inter-modulation interference.

According to a second aspect, there is provided a method of handling interference caused by inter-modulation in a network node site comprising co-located network nodes comprising a first network node and a second network node, each for wireless communication and capable of frequency division duplex communication with a set of stations for wireless communication. The stations are wireless transceiver devices and communication from each of the network nodes to any of the respective stations is considered to be downlink communication performed on a downlink carrier frequency band and communication from any of the stations is considered to be uplink communication performed on an uplink carrier frequency band. The method comprises detecting an interference level by the second network node on a transmission received on the associated uplink carrier frequency band for a subset of stations of the set of stations associated with the second network node, and determining whether the interference level indicates probable inter-modulation interference. If the interference level indicates probable inter-modulation interference, the method proceeds with scheduling an uplink transmission grant for at least one of the stations of the subset of stations associated with the second network node, wherein the uplink transmission grant is valid for a first transmission time interval, transmitting the uplink transmission grant to the at least one station of the subset of stations associated with the second network node, assigning a transmit level at the first transmission time interval on a downlink carrier frequency band of the first network node that has a frequency relation to the uplink carrier frequency band on which the interference level indicated probable inter-modulation interference such that inter-modulation interference is reduced on the uplink carrier frequency band at the first transmission time interval, and receiving an uplink transmission from the at least one of the stations of the subset of stations associated with the second network node at the first transmission time interval.

The co-located network nodes may share a network node site controller, wherein the method may comprise exchanging, between the network nodes via the network node site controller, information on interference levels which indicate the probable inter-modulation interference.

The method may comprise identifying the at least one of the stations of the subset of stations, wherein significant inter-modulation interference is probable for the at least one of the stations, by determining whether the interference level indicates probable inter-modulation interference may comprise receiving a power head room report from at least one of the stations of the subset of stations, determining based on at least the power head room report whether the station is transmitting on maximum power, and, if it is determined that the station is transmitting on maximum power and a signal-to-interference-and-noise ratio is below a threshold, inter-modulation interference is determined as probable for the at least one of the stations.

The scheduling of an uplink transmission grant valid for the first transmission time interval may be for a future transmission time interval and may be performed at a present transmission time interval.

The assigning of transmit level on the downlink carrier frequency band may comprise transmitting only system information, wherein the system information may comprise control channel signals, reference signal or synchronization signals, or any combination thereof. The assigning of transmit level on the downlink carrier frequency band may comprise transmitting at a lower power than nominal power.

The communication from any of the network nodes to any of the stations associated therewith may be performed also on a further downlink carrier frequency band, or communication from any of the stations associated therewith may be performed also on a further uplink carrier frequency band for carrier aggregation, wherein detecting an interference level and determining whether the interference level indicates probable inter-modulation interference may be performed also for the further uplink carrier frequency band, and the assigning of transmit level on the downlink carrier frequency band may be performed on the one of the downlink carrier frequency bands that has a frequency relation to the one of the uplink carrier frequency bands on which the interference level indicated probable inter-modulation interference.

If the interference level indicates probable inter-modulation interference, assigning of a transmit level on the downlink carrier frequency band at a second transmission time interval may be performed such that inter-modulation interference may be reduced on the uplink carrier frequency band at the second transmission time interval, wherein the second transmission time interval may be periodically scheduled. The periodical scheduling may be coordinated with randomized uplink grants for all connected stations such that probability for each station to transmit on the uplink carrier frequency band during the second transmission intervals is non-zero. The periodical scheduling of the second transmission time interval may be coordinated such that the second transmission time interval occurs, at least periodically, at a subset of transmission time intervals allocated to transmit a random access message to the network node on the uplink carrier frequency band.

According to a third aspect, there is provided a computer program comprising instructions which, when executed on a processor of a communication apparatus, causes the communication apparatus to perform the method according to any of the first and the second aspects.

According to a fourth aspect, there is provided a network node for wireless communication capable of frequency division duplex communication with a set of stations for wireless communication. The stations are wireless transceiver devices and communication from the network node to any of the stations is considered to be downlink communication performed on a downlink carrier frequency band and communication from any of the stations is considered to be uplink communication performed on an uplink carrier frequency band. The network node comprises an interference level detector arranged to detect an interference level on the uplink carrier frequency band for a subset of stations of the set of stations, and a controller arranged to determine whether the interference level indicates probable inter-modulation interference. The controller is arranged to, if the interference level indicates probable inter-modulation interference, schedule an uplink transmission grant for at least one of the stations of the subset of stations, wherein the uplink transmission grant is valid for a first transmission time interval, cause a transmitter of the network node to transmit the uplink transmission grant to the at least one station of the subset of stations, allocate a transmit level on the downlink carrier frequency band at the first transmission time interval such that inter-modulation interference is reduced on the uplink carrier frequency band at the first transmission time interval, and cause a receiver of the network node to receive an uplink transmission from the at least one station of the subset of stations at the first transmission time interval.

The controller may be arranged to identify the at least one of the stations of the subset of stations, wherein significant inter-modulation interference is probable for the at least one of the stations, by being arranged to receive, by the receiver of the network node, a power head room report from at least one of the stations of the subset of stations, determine based on at least the power head room report whether the station is transmitting on maximum power, and, if determined that the station is transmitting on maximum power and a signal-to-interference-and-noise ratio is below a threshold, determine inter-modulation interference as probable for the at least one of the stations.

To schedule an uplink transmission grant valid for the first transmission time interval may be for a future transmission time interval and may be performed at a present transmission time interval.

To assign the transmit level on the downlink carrier frequency band may be performed by the controller which may be arranged to enable transmission of only system information, wherein the system information may comprise control channel signals, reference signal or synchronization signals, or any combination thereof.

To assign the transmit level on the downlink carrier frequency band may be performed by the controller which may be arranged to enable transmission at a lower power than nominal power.

The communication from the network node to any of the stations may be performed also on a second downlink carrier frequency band, or communication from any of the stations may be also performed on a second uplink carrier frequency band for carrier aggregation, wherein to assign the transmit level on the downlink carrier frequency band may be performed by the controller which may assign for the downlink carrier frequency band that has a frequency relation to an uplink carrier frequency band on which the interference level indicated probable inter-modulation interference.

If the interference level indicates probable inter-modulation interference, the network node may be arranged to assign a transmit level on the downlink carrier frequency band at a second transmission time interval such that inter-modulation interference is reduced on the uplink carrier frequency band at the second transmission time interval, wherein the second transmission time interval may be periodically scheduled. The network node may be arranged to control the periodical scheduling such that it is coordinated with randomized uplink grants for all connected stations such that probability for each station to transmit on the uplink carrier frequency band during the second transmission intervals is non-zero. The network node may be arranged to control the periodical scheduling of the second transmission time interval such that it is coordinated such that the second transmission time interval occurs, at least periodically, at a subset of transmission time intervals allocated to transmit a random access message to the network node on the uplink carrier frequency band.

According to a fifth aspect, there is provided a network node site comprising co-located network nodes comprising a first network node and a second network node, each for wireless communication and capable of frequency division duplex communication with a set of stations for wireless communication. The stations are wireless transceiver devices and communication from each of the network nodes to any of the respective stations is considered to be downlink communication performed on a downlink carrier frequency band and communication from any of the stations is considered to be uplink communication performed on an uplink carrier frequency band. The network node site comprises a network node site controller. The second network node is arranged to detect an interference level on a transmission received on the associated uplink carrier frequency band for a subset of stations of the set of stations associated with the second network node. The network node controller is arranged to determine whether the interference level indicates probable inter-modulation interference. If the interference level indicates probable inter-modulation interference, the second network node is arranged to schedule an uplink transmission grant for at least one of the stations of the subset of stations associated with the second network node, and transmit the uplink transmission grant to the at least one station of the subset of stations associated with the second network node. The uplink transmission grant is valid for a first transmission time interval. The first network node is arranged to assign a transmit level at the transmission time interval on a downlink carrier frequency band of the first network node that has a frequency relation to the uplink carrier frequency band on which the interference level indicated probable inter-modulation such that inter-modulation interference is reduced on the uplink carrier frequency band associated with the second network node.

The co-located network nodes may share the network node site controller, wherein the network nodes may be arranged to exchange, via the network node site controller, information on interference levels which indicate the probable inter-modulation interference.

The network node site may be arranged to identify the at least one of the stations of the subset of stations, wherein significant inter-modulation interference is probable for the at least one of the stations, by being performed by the second network node which may be arranged receive a power head room report from at least one of the stations of the subset of stations, and determine based on at least the power head room report whether the station is transmitting on maximum power. If determined that the station is transmitting on maximum power and a signal-to-interference-and-noise ratio is below a threshold, it may be determined that inter-modulation interference is probable for the at least one of the stations.

To schedule an uplink transmission grant valid for the first transmission time interval may be for a future transmission time interval and may be performed at a present transmission time interval.

To assign the transmit level on the downlink carrier frequency band may be performed by the first network node which may be arranged to enable to transmit only system information, wherein the system information may comprise control channel signals, reference signal or synchronization signals, or any combination thereof.

To assign the transmit level on the downlink carrier frequency band may be performed by the first network node which may be arranged to enable to transmit at a lower power than nominal power.

The communication from any of the network nodes to any of the stations associated therewith may be performed also on a further downlink carrier frequency band, or communication from any of the stations associated therewith may be also performed on a further uplink carrier frequency band for carrier aggregation, wherein to detect an interference level and determine whether the interference level indicates probable inter-modulation interference is performed also for the further uplink carrier frequency band, and to assign the transmit level on the downlink carrier frequency band may be performed on the one of the downlink carrier frequency bands that has a frequency relation to the one of the uplink carrier frequency bands on which the interference level indicated probable inter-modulation interference such that inter-modulation interference is reduced on that uplink carrier frequency band.

If the interference level indicates probable inter-modulation interference, the network node site controller may be arranged to assign a transmit level on the downlink carrier frequency band at a second transmission time interval such that inter-modulation interference is reduced on the uplink carrier frequency band at the second transmission time interval, wherein the second transmission time interval may be periodically scheduled. The network node site controller may be arranged to control the periodical scheduling such that it is coordinated with randomized uplink grants for all connected stations such that probability for each station to transmit on the uplink carrier frequency band during the second transmission intervals is non-zero. The network node site controller may be arranged to control the periodical scheduling of the second transmission time interval such that it is coordinated to occur, at least periodically, at a subset of transmission time intervals allocated to transmit a random access message to the network node on the uplink carrier frequency band.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of handling interference, a network, NW, node, a NW node site and computer programs for the same are disclosed below. The interference on topic is caused by inter-modulation in a NW node, or NW node site comprising a plurality of co-located NW nodes, for wireless communication capable of frequency division duplex communication with a set of stations for wireless communication. A station in this context may for example be a user equipment, UE, a modem, a cellphone, a computer or, any electric or electronic device capable of wireless communication with a NW node. More and more items we previously knew as rather simple objects are now capable of this, which has, and will, provide for some of the great improvements in many fields, even outside the conventional telecommunication industry. Examples are sensors, machines, medical equipment, monitoring devices, etc. that has been enhanced by being able to wirelessly communicate with wireless nodes of different wireless communication systems.

In this disclosure below, embodiments are exemplified within an 3GPP LTE context for the sake of easier understanding, but the invention is not limited to that Radio Access Technology (RAT). Other RATs, such as any of the commonly used technologies for public land mobile networks, may benefit from the invention in a similar way.

Figure 3:
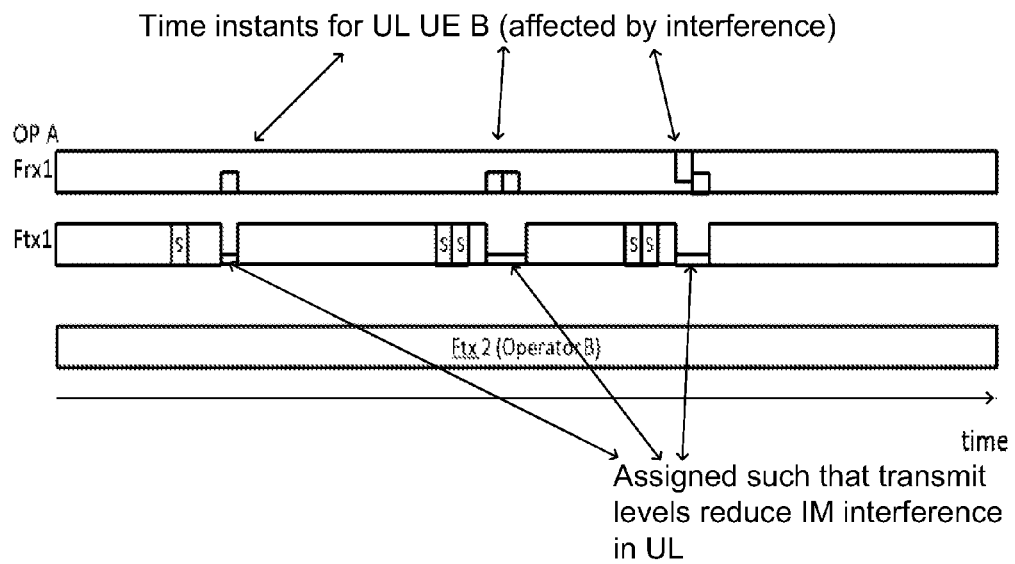
FIG. 3 is a signal scheme illustrating an approach of handling interference caused by inter-modulation in a network node for wireless communication.
Figure 4:
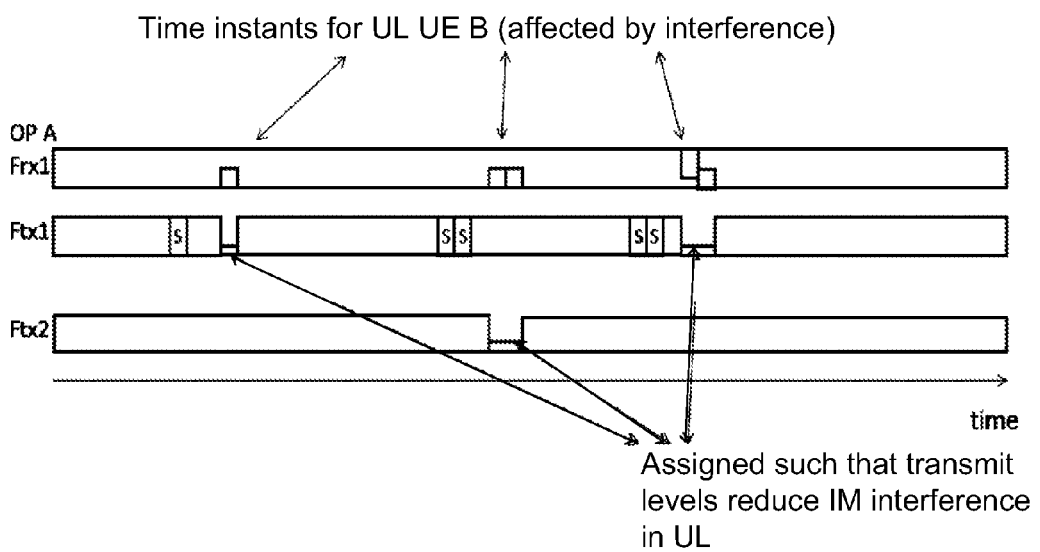
FIG. 4 is a signal scheme illustrating an approach of handling interference caused by inter-modulation in a network node for wireless communication.

FIGS. 3 and 4 show the principal sketch over different embodiments of the invention. FIG. 3 illustrates a case where a NW node (Operator A) transmits on an UL carrier frequency band (Ftx1) and receives on a different DL carrier frequency band (Frx1), where a transmit, TX, interferer is originating from another operator B transmitting on another UL carrier frequency band (Ftx2). In this case, consider that the NW node (Operator A) has detected at least one user equipment, UE, being affected by inter-modulation interference, e.g. passive inter-modulation, PIM, interference. The own transmitter (Ftx1), once an uplink, UL, grant is transmitted valid for a certain transmission time interval, TTI, reduces the TX power for Ftx1 carrier, i.e. only necessary signals such as Control Channel (CCH)/Common Reference Signal (CRS)/Synchronization Signal (SS) are transmitted, and possibly at lower TX power than nominal, as shown in FIG. 3. FIG. 4 shows another embodiment where the NW node (operator A) is in control of both PIM transmitter frequencies (Ftx1 and Ftx2). This could for instance be the case with band 17 (B17) and band 29 (B29) where B29 is a downlink (DL) only carrier aggregation band. In this case, the control unit in the NW node may substantially reduce the TX power for either of the two carriers, or in some embodiment on both TX carriers, as shown in FIG. 4. Again, note that the TX power reduction is only made at TTIs where reception from affected UEs are scheduled, as shown in FIGS. 3 and 4, hence in one embodiment the scheduler schedules a group of reception from affected UEs in the same TTI in order to reduce the number of TTIs where no or very little physical downlink shared channel (PDSCH) data is transmitted. It is to be noted that in FIGS. 3 and 4, the time instants indicated with "S" are time instants for UL grant transmissions to the UE affected by interference, which will be further elucidated with reference to step 506 of FIG. 5.

Considering these principles, methods and means, for accomplishing handling of inter-modulation interference of the type demonstrated above, will be explained below.

Figure 5:
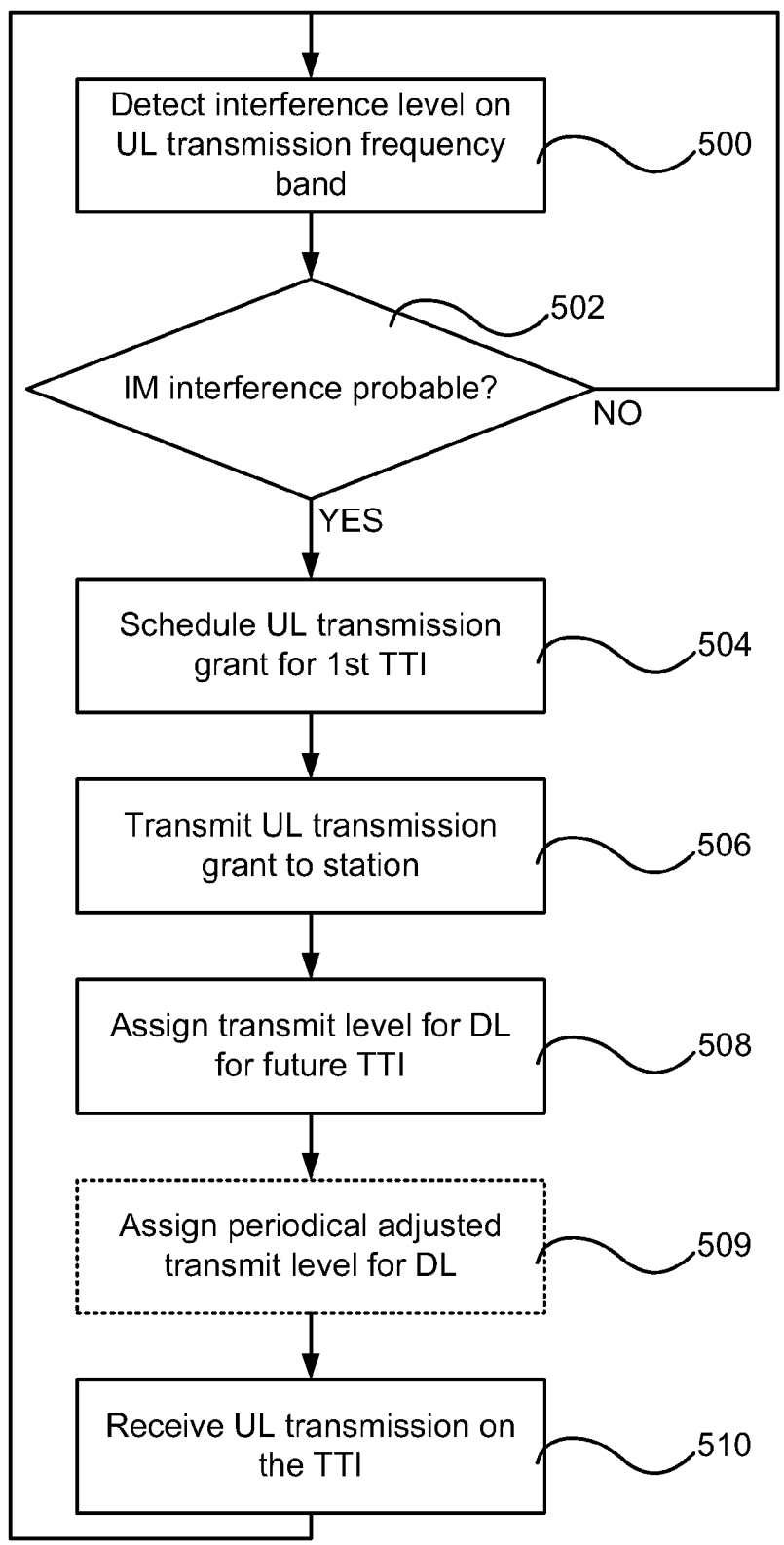
FIG. 5 is a flow chart illustrating a method of handling interference caused by inter-modulation in a network node for wireless communication according to an embodiment.

FIG. 5 is a flow chart illustrating a method of handling interference caused by inter-modulation in a network node for wireless communication according to an embodiment. An interference level for an uplink carrier frequency band is detected and determined 500. The interference level may not always be caused by inter-modulation since there may be many causes of interference. The probability for the determined interference being caused by inter-modulation is therefore checked 502. This may be made based on knowledge about different circumstances. This probability may be determined from performance figures of a NW node or NW node site. For example, the determining may be based on statistics of the NW node where interference, i.e. possible inter-modulation issues, for UL transmissions on one or more carrier frequency bands may be checked against statistics on DL transmission load on one or more carrier frequency bands. From this, the determination may be made for example by correlating the UL statistics with the DL load statistics. If the inter-modulation interference is not the probable cause of interference, the method proceeds without taking any actions against inter-modulation interference and may return to check again, e.g. periodically. If the inter-modulation interference is the probable and substantial cause of interference, the method proceeds with handling the inter-modulation issue. The network node schedules 504 an UL grant for a first TTI to the UE or set of UEs that is affected by the probable inter-modulation issues. This UL grant is valid for a second (future) TTI. The UL grant is transmitted 506 to the UE and the NW node controls its transmissions, as demonstrated with reference to FIGS. 3 and 4, by assigning 508 a DL transmit level for the second TTI where it reduces the TX power, e.g. only necessary signals such as Control Channel (CCH)/Common Reference Signal (CRS)/Synchronization Signal (SS) are transmitted, and possibly at lower TX power than nominal. The network node then receives 510 UL transmissions on the second TTI, wherein the inter-modulation interference hopefully is reduced such that the UL transmissions can be properly received.

The above demonstrated approach is based on determining one or more UEs which are affected by probable inter-modulation issues, and handling them as described above. However, consider that inter-modulation issues are determined for one or some UEs based on high interference that seems probable to emanate from inter-modulation. The issues may also be present for UEs that the NW node not has been able to determine interference and it probable cause for, e.g. due to too high interference. For this kind of issue, the NW node may, when inter-modulation issues are determined to be probable for some UEs, perform the similar approach as above but for a general set of UEs. This can be made by assigning 509 a periodical adjusted transmit level, i.e. reduce the TX power, e.g. only necessary signals such as Control Channel (CCH)/Common Reference Signal (CRS)/Synchronization Signal (SS) are transmitted, and possibly at lower TX power than nominal, for some TTIs (say every $10^{th}$, or $50^{th}$), wherein the scheduler schedules the UL transmissions such that all stations get an about equal amount of UL transmissions in TTIs where the inter-modulation reducing measures demonstrated above are taken. A probability for each station to transmit on the uplink carrier frequency band during the second transmission intervals will thus be non-zero.

According to some embodiments, at least some of the TTIs where inter-modulation reducing measures as demonstrated above has been taken may be chosen by the scheduler among a subset of TTIs where possible random access channel, RACH, transmission is allocated. This may provide the advantage that at least some of the RACH occasions may be unaffected by inter-modulation interference.

The procedure above may be repeated, e.g. periodically, to check whether the inter-modulation issue remains.

Figure 1:
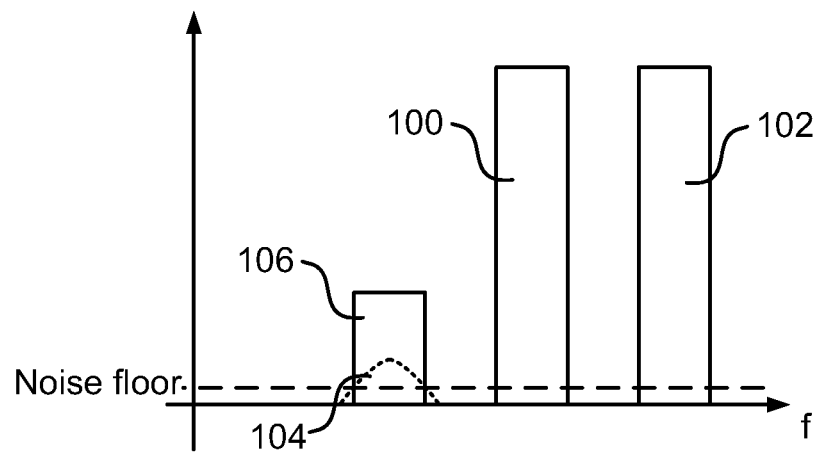
FIG. 1 schematically illustrates how inter-modulation issues may degrade a signal.
Figure 2:
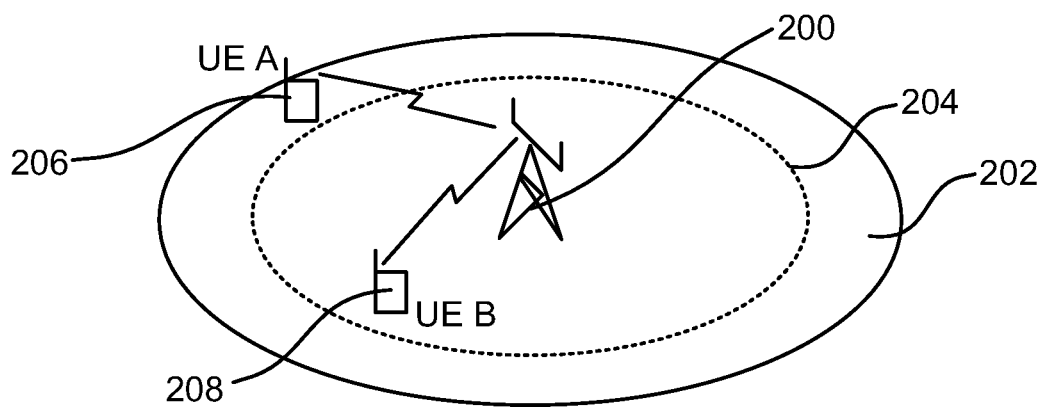
FIG. 2 schematically illustrates a base station operating a cell and how inter-modulation degradation may limit the range of the base station.
Figure 6:
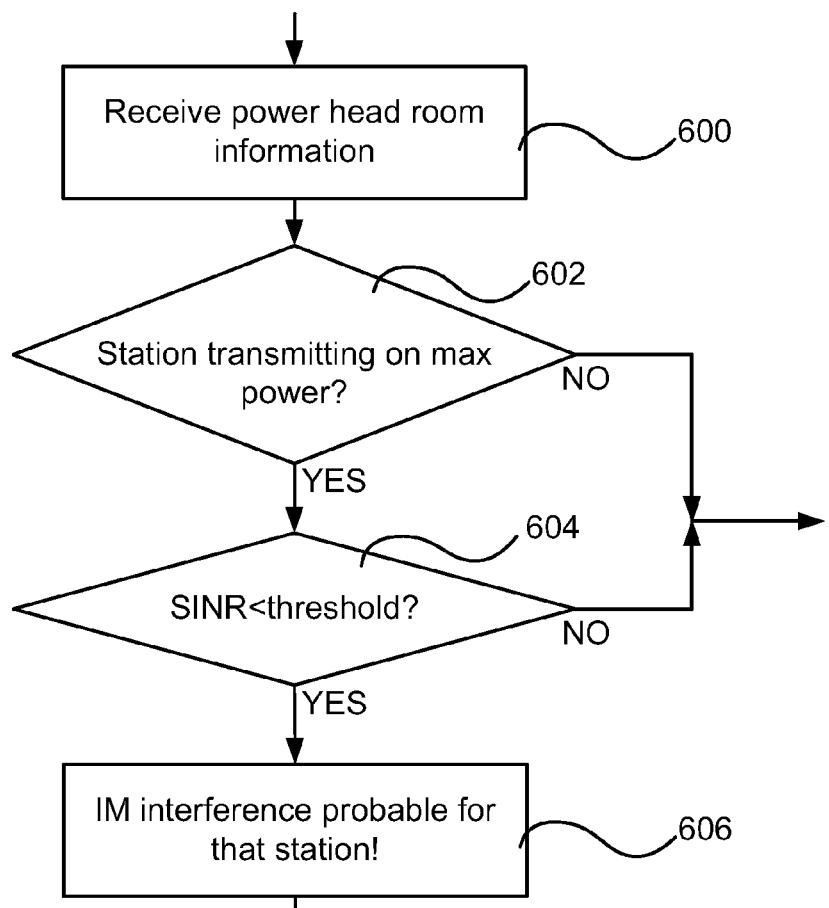
FIG. 6 is a flow chart illustrating an approach for determining whether inter-modulation interference is probable.

FIG. 6 is a flow chart illustrating an approach for determining whether inter-modulation interference is probable (and significant) for a particular station. As demonstrated above, the probability is determined on what knowledge the NW node has about different situations, e.g. from signalling, measurements, states, etc. The approach below illustrates, in the context of LTE, one way of determining the probability based on a few available figures, but similar approaches are equally applicable where other types of information are available, e.g. in the context of other communication systems. Referring to FIG. 2, for better understanding what is demonstrated with reference to FIG. 6, the UE A 206 will be identified as having probable inter-modulation issues which are significant, while the UE B 208 will not be targeted by the approach demonstrated with reference to FIG. 6 below.

Figure 7:
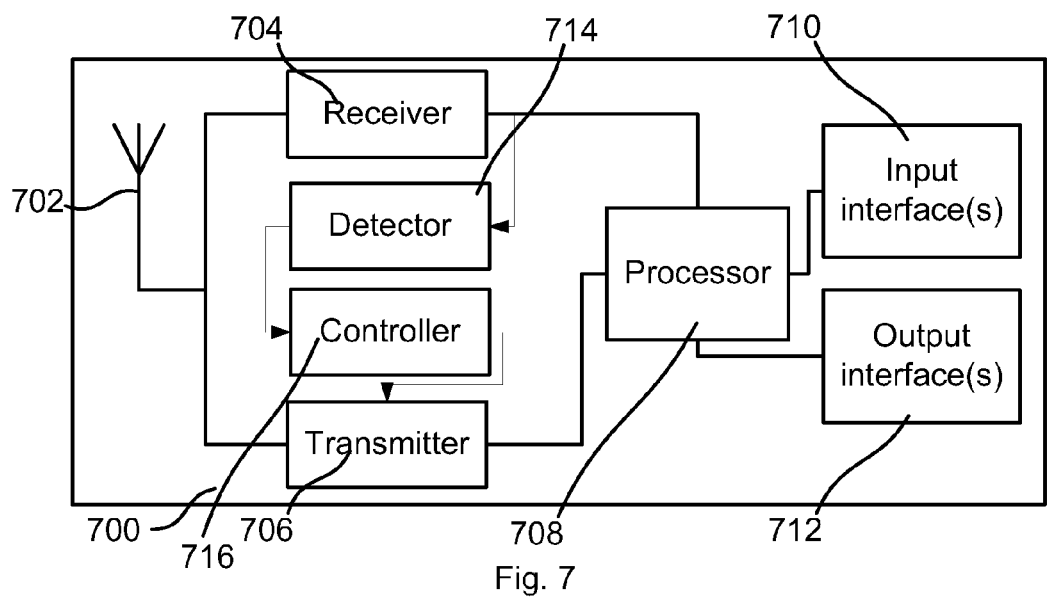
FIG. 7 is a block diagram schematically illustrating a network node according to an embodiment.

The NW node receives 600 information from the UE on power headroom. This is normally presented by the UE at some occasions, e.g. at a quickly changing path loss or periodically, and indicated if the UE is able to transmit at a higher power level, and possibly how much higher. From this, the NW node may determine 602 if the UE is transmitting on its maximum power. If it is not, too low power applied at the UE may be the cause of interference, or more correctly, too low signal-to-interference-and-noise ratio, SINR, and the inter-modulation interference is not considered the probable cause, and the method may proceed without taking any actions against inter-modulation interference. If the UE is determined to be transmitting at its maximum power, the SINR is checked against a threshold. If the SINR is above the threshold, interference is not (anymore) considered to be an issue, and the method may proceed without taking any actions against inter-modulation interference. On the other hand, if SINR is below the threshold, inter-modulation interference is determined 606 to be probable for that UE. In summary, if the UE is known to transmit at full power and the SINR still does not reach a threshold, interference is an issue and considered to be inter-modulation interference issue, since other mechanisms in a cellular communication network, e.g. mobility measurements handling this by for example handover etc., are presumed to take care of other noise and interference issues. A further or alternative check that is feasible is whether there is a frequency relation between the UL carrier frequency band and the possibly interfering DL carrier frequency band such that any harmonics of the DL carrier frequency band may interfere with any signals on the UL carrier frequency band FIG. 7 is a block diagram schematically illustrating a NW node 700 according to an embodiment. The NW node 700 comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be user interfaces and/or signal interfaces, e.g. electrical or optical. The NW node 700 is arranged to operate in a cellular communication network, e.g. as a base station operating a cell. In particular, by the processing element 708 being arranged to perform the embodiments demonstrated with reference to FIGS. 2 to 6, the NW node 700 is capable of handling inter-modulation interference issues. The processing element 708 can also fulfill a multitude of tasks, ranging from signal processing to enable reception and transmission since it is connected to the receiver 704 and transmitter 706, executing applications, controlling the interfaces 710, 712, etc.

The NW node 700 comprises an interference level detector 714 arranged to detect an interference level on the uplink carrier frequency band for a subset of stations of the set of stations. The interference level detector 714 is thus connected to the receiver 704 to be able to gain levels and information for performing its task. The interference level detector 714 is illustrated as a separate functional element, but may be implemented within the processing element 708 in some embodiments. This will be further demonstrated with reference to FIG. 10. The NW node 700 further comprises a controller 716 arranged to determine whether the interference level indicates probable inter-modulation interference. The interference level detector 714 and controller may thus be considered to perform the steps 500 and 502 of FIG. 5 to, e.g. based on statistics as demonstrated above, determine if inter-modulation issues exist, and the steps demonstrated with reference to FIG. 6 for identifying whether a particular station is probable to be significantly affected by the inter-modulation issues. The controller 716 is further arranged to, if the interference level indicates probable inter-modulation interference, schedule an uplink transmission grant for at least one of the stations of a subset of stations, e.g. as identified as demonstrated with reference to FIG. 6. The uplink transmission grant is valid for a future TTI. The controller 716, which is connected to the transmitter 706, is further arranged to cause the transmitter 706 to transmit the uplink transmission grant to the at least one station of the subset of stations, and to allocate a transmit level on the downlink carrier frequency band at the future TTI such that inter-modulation interference is reduced on the uplink carrier frequency band. The controller is thus considered to also perform the tasks of steps 504 and 508 of FIG. 5. The controller 716 is illustrated as a separate functional element, but may be implemented within the processing element 708 in some embodiments. This will be further demonstrated with reference to FIG. 10.

Figure 8:
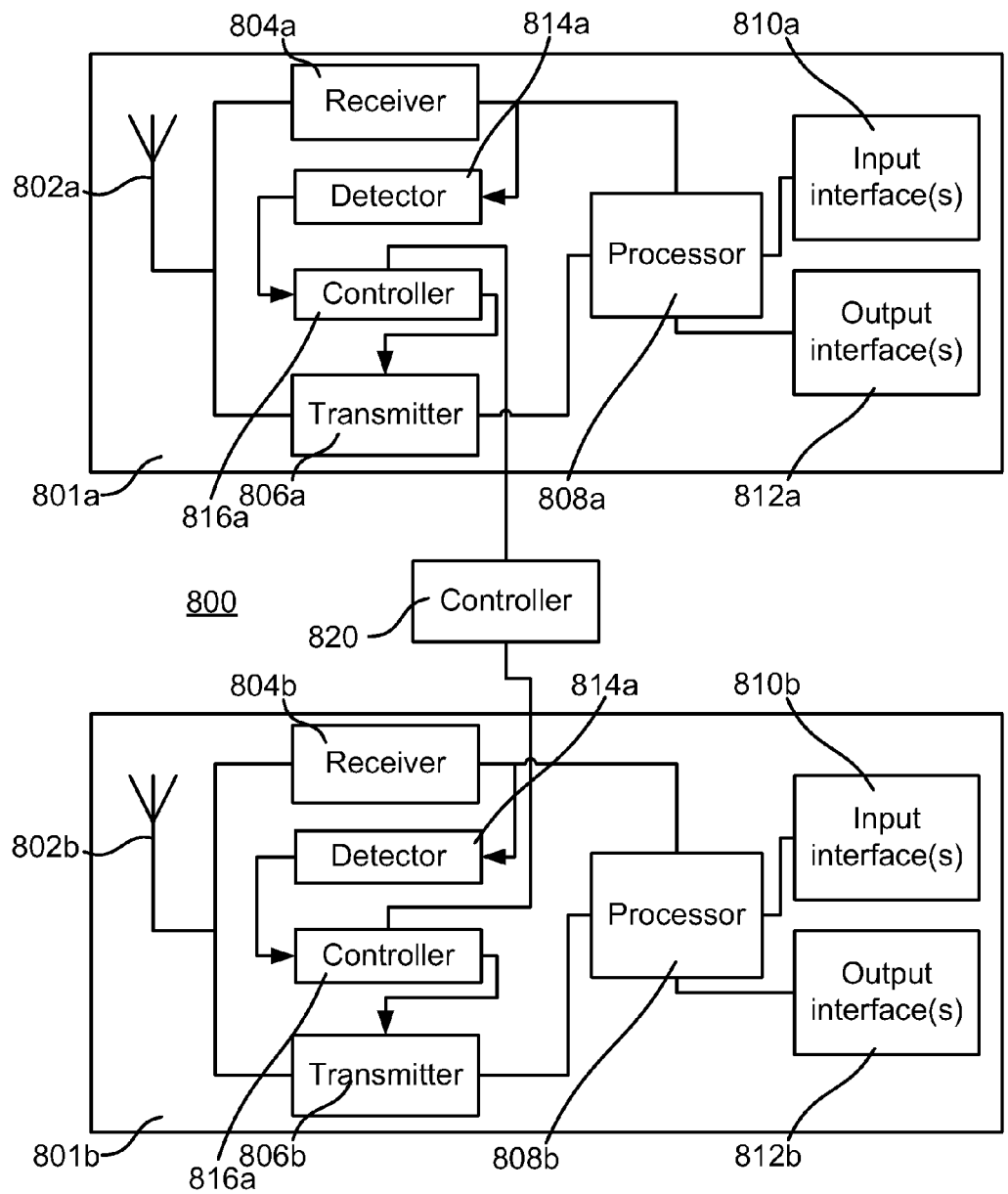
FIG. 8 is a block diagram schematically illustrating a network node site according to an embodiment.

FIG. 8 is a block diagram schematically illustrating a NW node site 800 according to an embodiment. The NW node site 800 comprises two or more co-located NW nodes 801*a*, 801*b* and a NW node site controller 820. The NW nodes 801*a*, 801*b* resembles the NW node 700 demonstrated with reference to FIG. 7. That is, the NW nodes 801*a*, 801*b* each comprises an antenna arrangement 802*a*, 802*b*, a receiver 804*a*, 804*b* connected to the antenna arrangement 802*a*, 802*b*, a transmitter 806*a*, 806*b* connected to the antenna arrangement 802*a*, 802*b*, a processing element 808*a*, 808*b* which may comprise one or more circuits, one or more input interfaces 810*a*, 810*b* and one or more output interfaces 812*a*, 812*b*. The interfaces 810*a*, 810*b*, 812*a*, 812*b* can be user interfaces and/or signal interfaces, e.g. electrical or optical. The NW nodes 801*a*, 801*b* may be arranged to operate in a cellular communication network, e.g. as a base station operating a cell. The processing element 808*a*, 808*b* can also fulfill a multitude of tasks, ranging from signal processing to enable reception and transmission since it is connected to the receiver 804*a*, 804*b* and transmitter 806*a*, 806*b*, executing applications, controlling the interfaces 810*a*, 810*b*, 812*a*, 812*b*, etc. The NW nodes 801*a*, 801*b* each may comprise an interference level detector 814*a*, 814*b* arranged to detect an interference level on the uplink carrier frequency band for a subset of stations of the set of stations. The interference level detector 814*a*, 814*b* is thus connected to the receiver 804*a*, 804*b* to be able to gain levels and information for performing its task. The interference level detectors 814*a*, 814*b* are illustrated as separate functional elements, but may be implemented within the processing element 808*a*, 808*b* or in the common NW node site controller 820 in some embodiments. The NW nodes 801*a*, 801*b* may further each comprise a controller 816*a*, 816*b* arranged to determine whether the interference level indicates probable inter-modulation interference. The interference level detectors 814*a*, 814*b* and controllers 816*a*, 816*b* may alternatively be considered to be more or less only interfaces towards the NW node site controller 820 which may perform the activities and the interference level detectors 814*a*, 814*b* are interfaces towards the receivers 804*a*, 804*b* for collecting signals to work on, and the controllers 816*a*, 816*b* are interfaces towards the transmitters 805*a*, 806*b* to control the reduced transmissions. Alternatively, the NW node site controller 820 may be considered to be more or less only an interface between interference level detectors 814*a*, 814*b* and controllers 816*a*, 816*b*, which may perform the activities and exchange necessary information via the NW node site controller 820, i.e. the functions of the NW node site controller 820 is distributed wherein the NW node site controller (820) per se, at least partially, may be regarded as distributed, e.g. between interference level detectors 814*a*, 814*b* and controllers 816*a*, 816*b*, or processing elements 808*a*, 808*b*.

In the following, the functions related to inter-modulation interference handling will be described from the point of view that a first NW node 801*a* transmits a DL signal which may interfere with an UL signal to a second NW node 801*b*. This applies of course the other way too, but for the sake of brevity, the explanation is made from the above referenced point of view wherein the skilled reader readily understands how it will work both ways.

The second NW node 801*b* is arranged to detect an interference level on a transmission received on an associated uplink carrier frequency band for a subset of stations or UEs of a set of stations or UEs associated with the second NW node 801*b*. The NW node site controller 820 is arranged to determine whether the interference level indicates probable inter-modulation interference. If the interference level indicates probable inter-modulation interference, the second NW node 801*b* is arranged to schedule an UL transmission grant for at least one of the stations of the subset of stations associated with the second NW node 801*b* by control from the NW node site controller 820. The UL transmission grant is valid for a future TTI, and transmit the UL transmission grant to the at least one station of the subset of stations associated with the second NW node 801*b*. The first NW node 801*a* is arranged to assign a transmit level, by control from the NW node site controller 820, at the future TTI on a DL carrier frequency band of the first NW node 801*a* that has a frequency relation to the UL carrier frequency band on which the interference level indicated probable inter-modulation such that inter-modulation interference is reduced on the UL carrier frequency band associated with the second NW node 801*b*.

Figure 9:
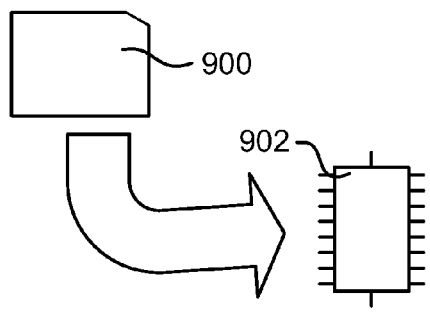
FIG. 9 schematically illustrates a computer-readable medium and a processing device.

The methods according to the present invention is suitable for implementation with aid of processing means, such as computers and/or processors, especially for the case where the processing element 708 demonstrated above comprises a processor handling interference caused by inter-modulation in a network node for wireless communication capable of frequency division duplex communication with a set of stations for wireless communication, as demonstrated above. The processing element 708 may for example be any one of the processing elements 708, 714, 716, 808*a*, 808*b*, 814*a*, 814*b*, 816*a*, 816*b*, 820 demonstrated with reference to FIG. 7 or 8 above, or a combination of the processing elements as also has been demonstrated with reference to respective FIGS. 7 and 8. Therefore, there is provided computer programs, comprising instructions arranged to cause the processing means, processor, or computer to perform the steps of any of the methods according to any of the embodiments described with reference to FIGS. 3 to 6. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIGS. 3 to 6. The computer 902 and computer program product 900 can be arranged to execute the program code sequentially where actions of the any of the methods are performed stepwise. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

Figure 10:
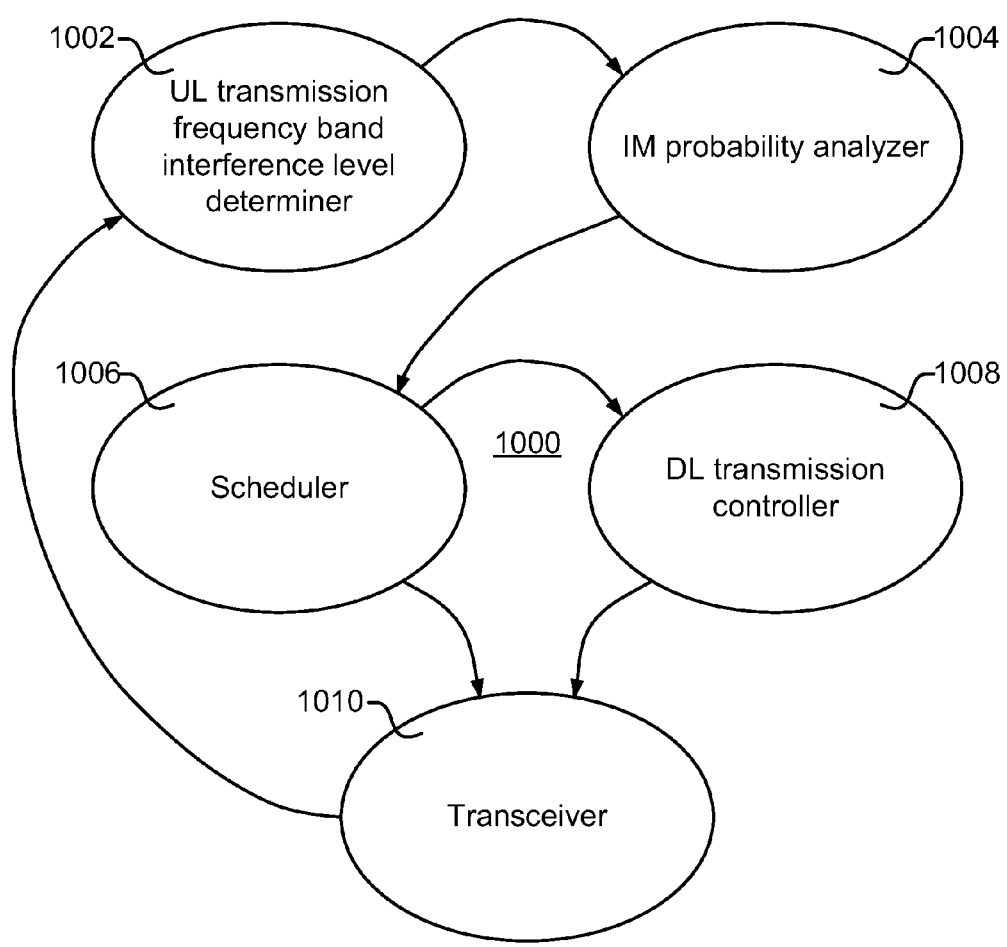
FIG. 10 schematically illustrates functional elements for handling interference caused by inter-modulation in a network node for wireless communication according to an embodiment.

FIG. 10 schematically illustrates functional elements for handling interference caused by inter-modulation in a NW node or NW node site for wireless communication according to an embodiment. The technology demonstrated above is suitably implemented as a combination of software and hardware, where the software parts may be performed at one dedicated processor or distributed between two or more processors, which sometimes may belong to different entities, e.g. between NW nodes of a NW node site. FIG. 10 therefore describes an apparatus 1000 from a functional point of view where the distribution between processors is arbitrary. The apparatus 1000, which may be a NW node or a NW node site as demonstrated with reference to FIGS. 7 and 8, comprises an UL carrier frequency band interference level determiner 1002, which based on input from a transceiver 1010 determines an interference level for an UL carrier frequency band. The determined interference level is provided to an inter-modulation probability analyser 1004 which determined whether interference is caused by inter-modulation, as demonstrated above. The inter-modulation analyser 1004 provides information whether the interference is caused by inter-modulation to a scheduler 1006 which schedules UL grants for a future TTI, as demonstrated above, provides the UL grants and schedule for transmitting it to the transceiver 1010 which transmits accordingly to one or more UEs, as also demonstrated above. The scheduler 1006 also provides information about the scheduled UL grant for the future TTI to a DL transmission controller 1008, which takes measures for reducing DL transmission at the future TTI, i.e. to transmit only necessary signals such as Control Channel (CCH)/Common Reference Signal (CRS)/Synchronization Signal (SS) are transmitted, and possibly at lower TX power than nominal. The DL transmission controller 1008 then provides information about that to the transceiver 1010, which then transmits only the necessary signals and possibly at lower TX power than nominal during the future TTI.

The invention claimed is:

1. A method of handling interference caused by inter-modulation in a network node for wireless communication capable of frequency division duplex communication with a set of stations for wireless communication, wherein the stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band, the method comprising:
    detecting an interference level on the uplink carrier frequency band for a subset of stations of the set of stations;
    determining whether the interference level indicates probable inter-modulation interference; and
    if the interference level indicates probable inter-modulation interference:
        scheduling an uplink transmission grant for at least one station of the subset of stations, wherein the uplink transmission grant is valid for a first transmission time interval;

transmitting the uplink transmission grant to the at least one station of the subset of stations;

assigning a transmit level on the downlink carrier frequency band at the first transmission time interval such that inter-modulation interference is reduced on the uplink carrier frequency band at the first transmission time interval; and receiving an uplink transmission from the at least one station of the subset of stations at the first transmission time interval.

2. The method of claim 1, comprising identifying the at least one station of the subset of stations, wherein significant inter-modulation interference is probable for the at least one station, by receiving a power head room report from at least one station of the subset of stations;

determining based on at least the power head room report whether the station is transmitting on maximum power; and if determined that the station is transmitting on maximum power and a signal-to-interference-and-noise ratio is below a threshold, determining inter-modulation interference as probable for the at least one station.

3. The method of claim 1, wherein the first transmission time interval comprises a future transmission time interval that occurs after a present transmission time interval, and wherein the scheduling of an uplink transmission grant comprises a scheduling of an uplink transmission grant valid for the future transmission time interval that is performed at the present transmission time interval.

4. The method of claim 1, wherein the assigning of transmit level on the downlink carrier frequency band comprises transmitting system information, wherein the system information comprises control channel signals, reference signal or synchronization signals, or any combination thereof.

5. The method of claim 1, wherein the assigning of transmit level on the downlink carrier frequency band comprises transmitting at a lower power than nominal power.

6. The method of claim 1,
wherein communication from the network node to any of the stations is performed also on a second downlink carrier frequency band, or communication from any of the stations is also performed on a second uplink carrier frequency band for carrier aggregation; and wherein the assigning of transmit level on the downlink carrier frequency band is performed on the downlink carrier frequency band that has a frequency relation to an uplink carrier frequency band on which the interference level indicated probable inter-modulation interference.

7. The method of claim 1,
wherein communication from the network node to any of the stations associated therewith is performed also on a further downlink carrier frequency band, or communication from any of the stations associated therewith is also performed on a further uplink carrier frequency band for carrier aggregation;

wherein detecting an interference level and determining whether the interference level indicates probable inter-modulation interference is performed also for the further uplink carrier frequency band; and wherein the assigning of the transmit level on the downlink carrier frequency band is performed on the one of the downlink carrier frequency bands that has a frequency relation to the one of the uplink carrier frequency bands on which the interference level indicated probable inter-modulation interference.

8. The method of claim 1, comprising, if the interference level indicates probable inter-modulation interference, assigning a transmit level on the downlink carrier frequency band at a second transmission time interval such that inter-modulation interference is reduced on the uplink carrier frequency band at the second transmission time interval, wherein the second transmission time interval is periodically scheduled.

9. The method of claim 8, wherein the periodical scheduling of the second transmission time interval is coordinated such that the second transmission time interval occurs, at least periodically, at a subset of transmission time intervals allocated to transmit a random access message to the network node on the uplink carrier frequency band.

10. A method of handling interference caused by inter-modulation in a network node site comprising co-located network nodes comprising a first network node and a second network node, wherein each co-located network node is for wireless communication and is capable of frequency division duplex communication with a set of stations for wireless communication, wherein the stations are wireless transceiver devices and communication from each of the network nodes to any of the respective stations is considered to be downlink communication performed on a downlink carrier frequency band and communication from any of the stations is considered to be uplink communication performed on an uplink carrier frequency band, the method comprising:

detecting an interference level by the second network node on a transmission received on the associated uplink carrier frequency band for a subset of stations of the set of stations associated with the second network node;

determining whether the interference level indicates probable inter-modulation interference; and if the interference level indicates probable inter-modulation interference:

scheduling an uplink transmission grant for at least one of the stations of the subset of stations associated with the second network node, wherein the uplink transmission grant is valid for a first transmission time interval;

transmitting the uplink transmission grant to the at least one station of the subset of stations associated with the second network node;

assigning a transmit level at the first transmission time interval on a downlink carrier frequency band of the first network node that has a frequency relation to the uplink carrier frequency band on which the interference level indicated probable inter-modulation interference such that inter-modulation interference is reduced on the uplink carrier frequency band at the first transmission time interval; and receiving an uplink transmission from the at least one of the stations of the subset of stations associated with the second network node at the first transmission time interval.

11. The method of claim 10,
wherein the co-located network nodes share a network node site controller; and wherein the method comprises exchanging, between the network nodes via the network node site controller, information on interference levels which indicate the probable inter-modulation interference.

12. The method of claim 10, comprising identifying the at least one station of the subset of stations, wherein significant inter-modulation interference is probable for the at least one station, by
- receiving a power head room report from at least one of the stations of the subset of stations;
- determining based on at least the power head room report whether the station is transmitting on maximum power; and
- if determined that the station is transmitting on maximum power and a signal-to-interference-and-noise ratio is below a threshold, determining inter-modulation interference as probable for the at least one station.

13. The method of claim 10, wherein the first transmission time interval comprises a future transmission time interval that occurs after a present transmission time interval, and wherein the scheduling of an uplink transmission grant comprises a scheduling of an uplink transmission grant valid for the future transmission time interval that is performed at the present transmission time interval.

14. The method of claim 10, wherein the assigning of transmit level on the downlink carrier frequency band comprises transmitting system information, wherein the system information comprises control channel signals, reference signal or synchronization signals, or any combination thereof.

15. The method of claim 10, wherein the assigning of transmit level on the downlink carrier frequency band comprises transmitting at a lower power than nominal power.

16. The method of claim 10, comprising, if the interference level indicates probable inter-modulation interference, assigning a transmit level on the downlink carrier frequency band at a second transmission time interval such that inter-modulation interference is reduced on the uplink carrier frequency band at the second transmission time interval, wherein the second transmission time interval is periodically scheduled.

17. The method of claim 16, wherein the periodical scheduling of the second transmission time interval is coordinated such that the second transmission time interval occurs, at least periodically, at a subset of transmission time intervals allocated to transmit a random access message to the network node on the uplink carrier frequency band.

18. A computer program product stored on a non-transitory computer readable medium and comprising program instructions that, when executed on a processor of a network node for wireless communication, causes the network node to handle the interference caused by inter-modulation in the network node, wherein the network node is capable of frequency division duplex communication with a set of stations for wireless communication, wherein the stations are wireless transceiver devices and communication from the network node to any of the stations is considered to be downlink communication performed on a downlink carrier in a downlink carrier frequency band and communication from any of the stations is considered to be uplink communication performed on an uplink carrier in an uplink carrier frequency band, and wherein the program instructions cause the network node to:
- detect an interference level on the uplink carrier frequency band for a subset of stations of the set of stations;
- determine whether the interference level indicates probable inter-modulation interference; and
- if the interference level indicates probable inter-modulation interference:
  - schedule an uplink transmission grant for at least one station of the subset of stations, wherein the uplink transmission grant is valid for a first transmission time interval;
  - transmit the uplink transmission grant to the at least one station of the subset of stations;
  - assign a transmit level on the downlink carrier frequency band at the first transmission time interval such that inter-modulation interference is reduced on the uplink carrier frequency band at the first transmission time interval; and
  - receive an uplink transmission from the at least one station of the subset of stations at the first transmission time interval.

19. A computer program product stored on a non-transitory computer readable medium and comprising program instructions that, when executed on a processor of a network node site controller, cause the network node site controller to handle interference caused by inter-modulation in a network node site, wherein the network node site comprises co-located network nodes comprising a first network node and a second network node, wherein each co-located network node is for wireless communication and is capable of frequency division duplex communication with a set of stations for wireless communication, wherein the stations are wireless transceiver devices and communication from each of the network nodes to any of the respective stations is considered to be downlink communication performed on a downlink carrier frequency band and communication from any of the stations is considered to be uplink communication performed on an uplink carrier frequency band, wherein the program instructions cause the network node site controller to:
- detect an interference level by the second network node on a transmission received on the associated uplink carrier frequency band for a subset of stations of the set of stations associated with the second network node;
- determine whether the interference level indicates probable inter-modulation interference; and
- if the interference level indicates probable inter-modulation interference:
  - schedule an uplink transmission grant for at least one of the stations of the subset of stations associated with the second network node, wherein the uplink transmission grant is valid for a first transmission time interval;
  - transmit the uplink transmission grant to the at least one station of the subset of stations associated with the second network node;
  - assign a transmit level at the first transmission time interval on a downlink carrier frequency band of the first network node that has a frequency relation to the uplink carrier frequency band on which the interference level indicated probable inter-modulation interference such that inter-modulation interference is reduced on the uplink carrier frequency band at the first transmission time interval; and
  - receive an uplink transmission from the at least one of the stations of the subset of stations associated with the second network node at the first transmission time interval.

20. A network node for wireless communication capable of frequency division duplex communication with a set of stations for wireless communication, wherein the stations are wireless transceiver devices and communication from the network node to any of the stations is considered to be downlink communication performed on a downlink carrier frequency band and communication from any of the stations is considered to be uplink communication performed on an uplink carrier frequency band, the network node comprising:
- an interference level detector circuit configured to detect an interference level on the uplink carrier frequency band for a subset of stations of the set of stations; and
- a controller circuit configured to determine whether the interference level indicates probable inter-modulation interference, wherein the controller is configured to, if the interference level indicates probable inter-modulation interference,
  - schedule an uplink transmission grant for at least one of the stations of the subset of stations, wherein the uplink transmission grant is valid for a first transmission time interval;
  - cause a transmitter of the network node to transmit the uplink transmission grant to the at least one station of the subset of stations;
  - allocate a transmit level on the downlink carrier frequency band at the first transmission time interval such that inter-modulation interference is reduced on the uplink carrier frequency band at the first transmission time interval; and
  - cause a receiver of the network node to receive an uplink transmission from the at least one station of the subset of stations at the first transmission time interval.

21. The network node of claim 20, wherein the controller circuit is configured to identify the at least one station of the subset of stations, wherein significant inter-modulation interference is probable for the at least one station, by being configured to
- receive, by the receiver of the network node, a power head room report from at least one of the stations of the subset of stations;
- determine based on at least the power head room report whether the station is transmitting on maximum power; and
- if determined that the station is transmitting on maximum power and a signal-to-interference-and-noise ratio is below a threshold, determine inter-modulation interference as probable for the at least one station.

22. The network node of claim 20, wherein the first transmission time interval comprises a future transmission time interval that occurs after a present transmission time interval, and wherein the controller circuit is configured to schedule an uplink transmission grant by scheduling an uplink transmission grant valid for the future transmission time interval and is configured to schedule the uplink transmission grant at the present transmission time interval.

23. The network node of claim 20, wherein the controller circuit is configured to assign the transmit level on the downlink carrier frequency band and to enable transmission of system information, wherein the system information comprises control channel signals, reference signal or synchronization signals, or any combination thereof.

24. The network node of claim 20, wherein the controller circuit is configured to assign the transmit level on the downlink carrier frequency band and to enable transmission at a lower power than nominal power.

25. The network node of claim 20,
wherein communication from the network node to any of the stations is performed also on a second downlink carrier frequency band, or communication from any of the stations is also performed on a second uplink carrier frequency band for carrier aggregation; and
wherein the controller circuit is configured to assign the transmit level on a downlink carrier frequency band that has a frequency relation to an uplink carrier frequency band on which the interference level indicated probable inter-modulation interference.

26. The network node of claim 20, wherein if the interference level indicates probable inter-modulation interference, the network node is configured to assign a transmit level on the downlink carrier frequency band at a second transmission time interval such that inter-modulation interference is reduced on the uplink carrier frequency band at the second transmission time interval, wherein the second transmission time interval is periodically scheduled.

27. The network node of claim 26, wherein the network node is configured to control the periodical scheduling of the second transmission time interval such that it is coordinated such that the second transmission time interval occurs, at least periodically, at a subset of transmission time intervals allocated to transmit a random access message to the network node on the uplink carrier frequency band.

28. A network node site comprising co-located network nodes comprising a first network node and a second network node, each co-located network node is for wireless communication and capable of frequency division duplex communication with a set of stations for wireless communication, wherein the stations are wireless transceiver devices and communication from each of the network nodes to any of the respective stations is considered to be downlink communication performed on a downlink carrier frequency band and communication from any of the stations is considered to be uplink communication performed on an uplink carrier frequency band, the network node site comprising a network node site controller, wherein:
- the second network node is configured to detect an interference level on a transmission received on the associated uplink carrier frequency band for a subset of stations of the set of stations associated with the second network node;
- the network node controller is configured to determine whether the interference level indicates probable inter-modulation interference, wherein, if the interference level indicates probable inter-modulation interference,
  - the second network node is configured to schedule an uplink transmission grant for at least one of the stations of the subset of stations associated with the second network node, wherein the uplink transmission grant is valid for a first transmission time interval, and is further configured to transmit the uplink transmission grant to the at least one station of the subset of stations associated with the second network node; and
  - the first network node is configured to assign a transmit level at the transmission time interval on a downlink carrier frequency band of the first network node that has a frequency relation to the uplink carrier frequency band on which the interference level indicated probable inter-modulation such that inter-modulation interference is reduced on the uplink carrier frequency band associated with the second network node.

29. The network node site of claim 28, wherein the co-located network nodes share the network node site controller, wherein the network nodes are configured to exchange, via the network node site controller, information on interference levels which indicate the probable inter-modulation interference.

30. The network node site of claim 28, configured to identify the at least one station of the subset of stations, wherein significant inter-modulation interference is probable for the at least one station, wherein the second network node is configured to receive a power head room report from at least one of the stations of the subset of stations, and determine based on at least the power head room report whether the station is transmitting on maximum power, and if determined that the station is transmitting on maximum power and a signal-to-interference-and-noise ratio is below a threshold, to determine inter-modulation interference as probable for the at least one station.

31. The network node site of claim 28, wherein the first transmission time interval comprises a future transmission time interval that occurs after a present transmission time interval, and wherein the second network node schedules an uplink transmission grant valid for the future transmission time interval and performs this scheduling at the present transmission time interval.

32. The network node site of claim 28, wherein to assign the transmit level on the downlink carrier frequency band is performed by the first network node which is configured to transmit system information, wherein the system information comprises control channel signals, reference signal or synchronization signals, or any combination thereof.

33. The network node site of claim 28, wherein to assign the transmit level on the downlink carrier frequency band is performed by the first network node which is configured to transmit at a lower power than nominal power.

34. The network node site of claim 28, wherein communication from any of the network nodes to any of the stations associated therewith is performed also on a further downlink carrier frequency band, or communication from any of the stations associated therewith is also performed on a further uplink carrier frequency band for carrier aggregation;

wherein to detect an interference level and determine whether the interference level indicates probable inter-modulation interference is performed also for the further uplink carrier frequency band; and wherein to assign the transmit level on the downlink carrier frequency band is performed on the one of the downlink carrier frequency bands that has a frequency relation to the one of the uplink carrier frequency bands on which the interference level indicated probable inter-modulation interference such that inter-modulation interference is reduced on that uplink carrier frequency band.

35. The network node site of claim 28, wherein if the interference level indicates probable inter-modulation interference, the network node site controller is configured to assign a transmit level on the downlink carrier frequency band at a second transmission time interval such that inter-modulation interference is reduced on the uplink carrier frequency band at the second transmission time interval, wherein the second transmission time interval is periodically scheduled.

36. The network node site of claim 35, wherein the network node site controller is configured to control the periodical scheduling of the second transmission time interval such that it is coordinated to occur, at least periodically, at a subset of transmission time intervals allocated to transmit a random access message to the network node on the uplink carrier frequency band.

* * * * *